United States Patent
Li et al.

(10) Patent No.: US 9,755,323 B2
(45) Date of Patent: Sep. 5, 2017

(54) ANTENNA APPARATUS

(71) Applicant: FUJITSU LIMITED, Kawasaki-shi, Kanagawa (JP)

(72) Inventors: Zhengyi Li, Shinagawa (JP); Yoji Ohashi, Fucyu (JP); Kazumi Kasai, Shibuya (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 14/872,444

(22) Filed: Oct. 1, 2015

(65) Prior Publication Data

US 2016/0028163 A1 Jan. 28, 2016

Related U.S. Application Data

(63) Continuation of application No. PCT/JP2013/066115, filed on Jun. 11, 2013.

(51) Int. Cl.
| | |
|---|---|
| *H01Q 21/00* | (2006.01) |
| *H01Q 15/16* | (2006.01) |
| *H01Q 19/17* | (2006.01) |
| *H01Q 25/00* | (2006.01) |
| *H01Q 21/28* | (2006.01) |
| *H01Q 21/29* | (2006.01) |
| *H04L 12/911* | (2013.01) |

(52) U.S. Cl.
CPC ........... *H01Q 21/00* (2013.01); *H01Q 15/166* (2013.01); *H01Q 15/167* (2013.01); *H01Q 19/17* (2013.01); *H01Q 21/28* (2013.01); *H01Q 21/29* (2013.01); *H01Q 25/007* (2013.01); *H04L 47/82* (2013.01)

(58) Field of Classification Search
USPC .......................... 343/702, 700 MS, 836, 893
See application file for complete search history.

(56) References Cited

U.S. PATENT DOCUMENTS

| | | | |
|---|---|---|---|
| 2002/0085643 A1 | 7/2002 | Kitchener et al. | |
| 2009/0028332 A1 | 1/2009 | Parker et al. | |
| 2009/0296846 A1 | 12/2009 | Maru | |
| 2010/0060546 A1 | 3/2010 | Robson et al. | |

(Continued)

FOREIGN PATENT DOCUMENTS

| | | |
|---|---|---|
| JP | 2004-517549 | 6/2004 |
| JP | 2009-033747 | 2/2009 |

(Continued)

OTHER PUBLICATIONS

Colin Sheldon et al., "A 60GHz Line-of-Sight 2×2 MIMO Link Operating at 1.2Gbps", Antennas and Propagation Society International Symposium, AP-S 2008. IEEE, Jul. 5, 2008, pp. 1-4 (4 pages).

(Continued)

*Primary Examiner* — Jessica Han
*Assistant Examiner* — Hai Tran
(74) *Attorney, Agent, or Firm* — Fujitsu Patent Center

(57) ABSTRACT

An antenna apparatus includes N (2=<N) transmitting antennas configured to transmit RF signals having Orbital Angular Momentum (OAM) of designated modes, and N receiving antennas configured to make N pairs with the N transmitting antennas, respectively, and to receive the RF signals having OAM of the designated modes transmitted from the corresponding N transmitting antennas within the N pairs.

19 Claims, 11 Drawing Sheets

(56) References Cited

U.S. PATENT DOCUMENTS

2010/0135203 A1    6/2010   Maru
2010/0295753 A1   11/2010   Robson et al.
2013/0235885 A1*   9/2013   Chen .................... H04L 5/0044
                                                                370/468

FOREIGN PATENT DOCUMENTS

| WO | 02/054626  | 7/2002 |
| WO | 2005069443 | 7/2005 |
| WO | 2008059985 | 5/2008 |
| WO | 2009017230 | 2/2009 |
| WO | 2010026233 | 3/2010 |

OTHER PUBLICATIONS

Tzvika Naveh, "Mobile Backhaul: Fiber vs. Microwave", Case Study Analyzing Various Backhaul Technology Strategies, Oct. 2009, pp. 1-11 (11 pages).

Jian Wang et al., "Terabit free-space data transmission employing orbital angular momentum multiplexing", Nature Photonics, vol. 6, Jul. 2012, pp. 488-496 (9 pages).

International Search Report and Written Opinion of the International Searching Authority (Form PCT/ISA/210, Form PCT/ISA/237), mailed in connection with PCT/JP2013/066115 and mailed Sep. 10, 2013 (7 pages).

* cited by examiner

PROPAGATION
DIRECTION → OPTICAL AXIS

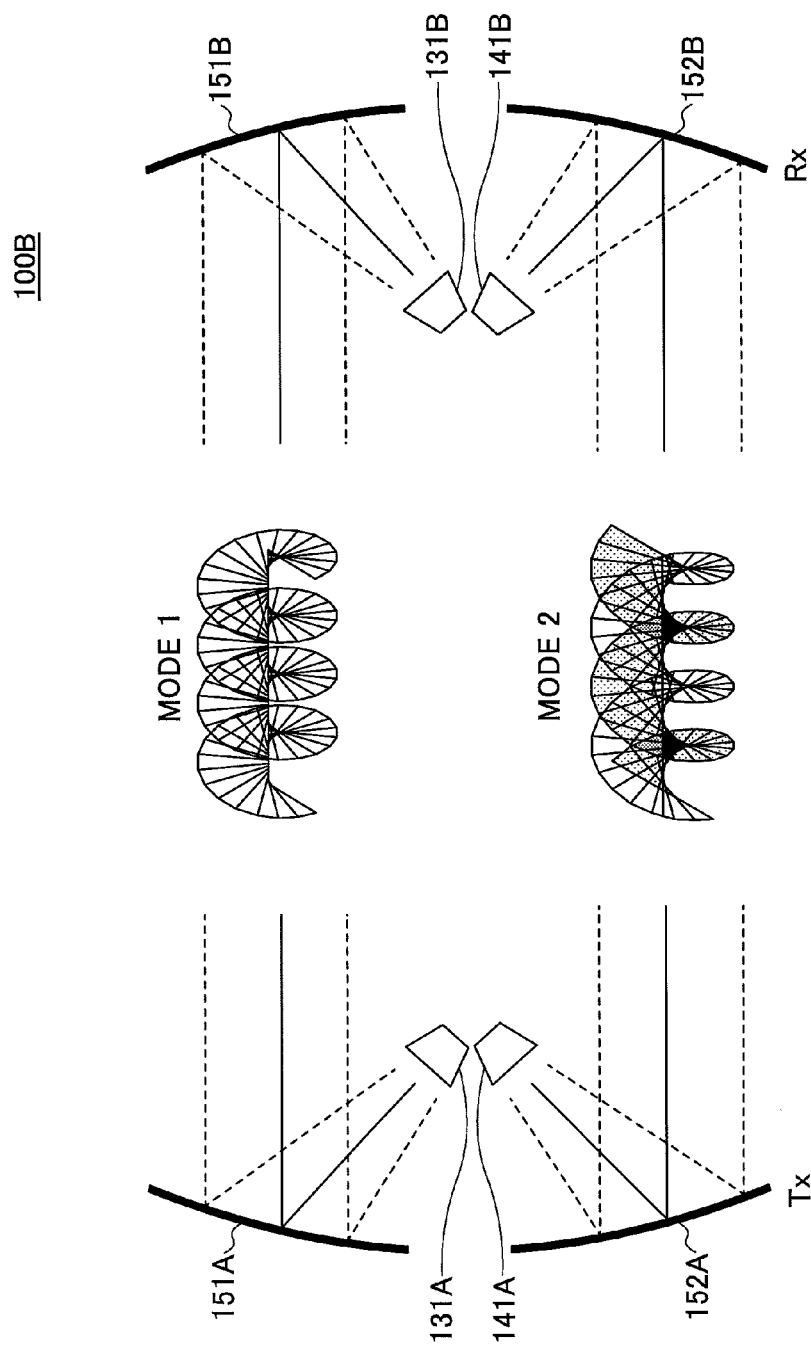

ANTENNA APPARATUS

CROSS-REFERENCE TO RELATED APPLICATION

This application is a continuation application of International Application PCT/JP2013/066115 filed on Jun. 11, 2013 and designated the U.S., the entire contents of which are incorporated herein by reference.

FIELD

The present invention is related to an antenna apparatus.

BACKGROUND

Microwave backhaul has been extensively used to connect base stations to the corresponding base station controllers for several years (for example, Non Patent Document 1).

However, currently, wireless networks are evolving from supporting voice-only to supporting both voice and high-speed data services. Thus, there will be an increasing need for bandwidth capacity at base stations and microwave backhaul.

Line-of-sight (LoS) MIMO can be considered as a candidate solution for high capacity microwave backhaul (for example, Non Patent Document 2). In these systems, due to the lack of multipath scattering, the antenna separation depends on communication distance to achieve space multiplexing.

For example, in a LoS MIMO system as illustrated in FIG. 1, 2*2 (two-by-two) form communication is performed by using transmitting antennas Tx1 and Tx2 and receiving antennas Rx1 and Rx2. Distance d between the transmitting antennas Tx1 and Tx2 which is necessary for separating the transmitting antennas Tx1 and Tx2 depends on communication distance L, as represented by formula (1).

$$d = \sqrt{\lambda L/2} \tag{1}$$

Here, $\lambda$ represents wavelength. In a case where the communication distance L is 400 m and communication frequency is 2.4 GHz, the distance d becomes about 5 m. In a case where the communication distance L is 400 m and communication frequency is 60 GHz, the distance d becomes about 1 m. Therefore, the antenna separation (the distance d) is relatively large and usually not available for compact devices. Furthermore, if the antenna separation shrinks, the channel capacity degrades drastically.

Recently, the study of orbital angular momentum (OAM) is very hot in high capacity optical communication (for example, Non Patent Document 3). OAM, similar to polarization (Spin Angular Momentum (SAM)), is also a fundamental property of electromagnetic waves.

As illustrated in FIG. 2, an electromagnetic wave having OAM has a spiral wavefront, and represents a linear phase delay with azimuthal angle OAM mode 1 (1=±1, ±2, ...) represents that there is a phase delay of $2l\pi$ during one cycle (physical one cycle). The phase delay is represented in an electric angle.

In the configuration of optical communication as illustrated in FIG. 3, OAM signals are superposed with respect to a single optical axis by using optical combiners (for example, Non Patent Document 3).

Since electromagnetic waves having different OAM modes are orthogonal to each other, high capacity is achieved due to multiple orthogonal channels.

However, it is difficult for a Radio Frequency (RF) signal to superpose OAM channels with respect to a single optical axis. Thus, it is difficult to multiplex the RF signal.

Non-Patent Document 1: Mobile Backhaul: Fiber vs. Microwave, Case Study Analyzing Various Backhaul Technology Strategies, Tzvika Naveh. [Searched on Jan. 29, 2013] Internet (http://www.ceragon.com/files/ceragon_mobile_backhau_fiber_microwave_white_paper.pdf)

Non-Patent Document 2: C. Sheldon, E. Torkildson, M. Seo, C. P. Yue, U. Madhow, and M. Rodwell, "A 60 GHz line-of-sight 2×2 MIMO link operating at 1.2 Gbps," in Proc. IEEE Antennas Propag. Soc. Int. Symp. (AP-S 2008), July 2008.

Non-Patent Document 3: J. Wang, J.-Y. Yang, I. M. Fazal, N. Ahmed, Y. Yan, H. Huang, Y. Ren, Y. Yue, S. Dolinar, M. Tur, and A. E. Willner, "Terabit free-space data transmission employing orbital angular momentum multiplexing," Nature Photonics, vol. 6, pp. 488-496, July 2012.

SUMMARY

An antenna apparatus according to an embodiment of the present invention includes N (2=<N) transmitting antennas configured to transmit RF signals having Orbital Angular Momentum (OAM) of designated modes, and N receiving antennas configured to make N pairs with the N transmitting antennas, respectively, and to receive the RF signals having OAM of the designated modes transmitted from the corresponding N transmitting antennas within the N pairs.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF DRAWINGS

FIG. 14 is a diagram illustrating an antenna apparatus according to another variation of the present embodiment.

DESCRIPTION OF EMBODIMENT

In the following, embodiments to which an antenna apparatus of the present invention is applied will be described.

Embodiment

Figure 1:
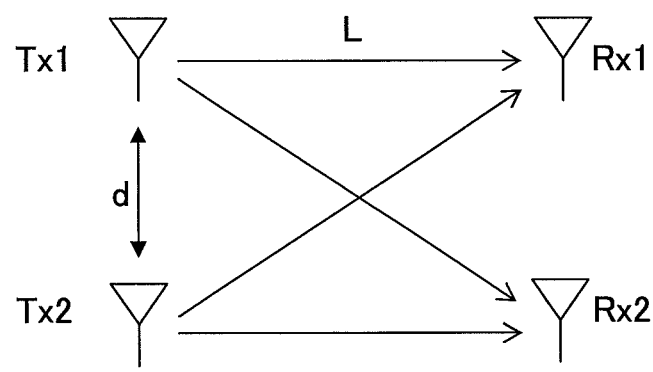
FIG. 1 illustrates a Los MIMO system.
Figure 2:
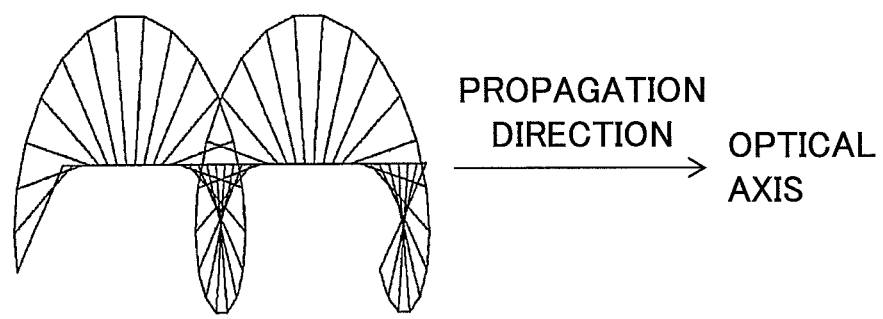
FIG. 2 illustrates a wavefront of an electromagnetic wave having OAM.
Figure 3:
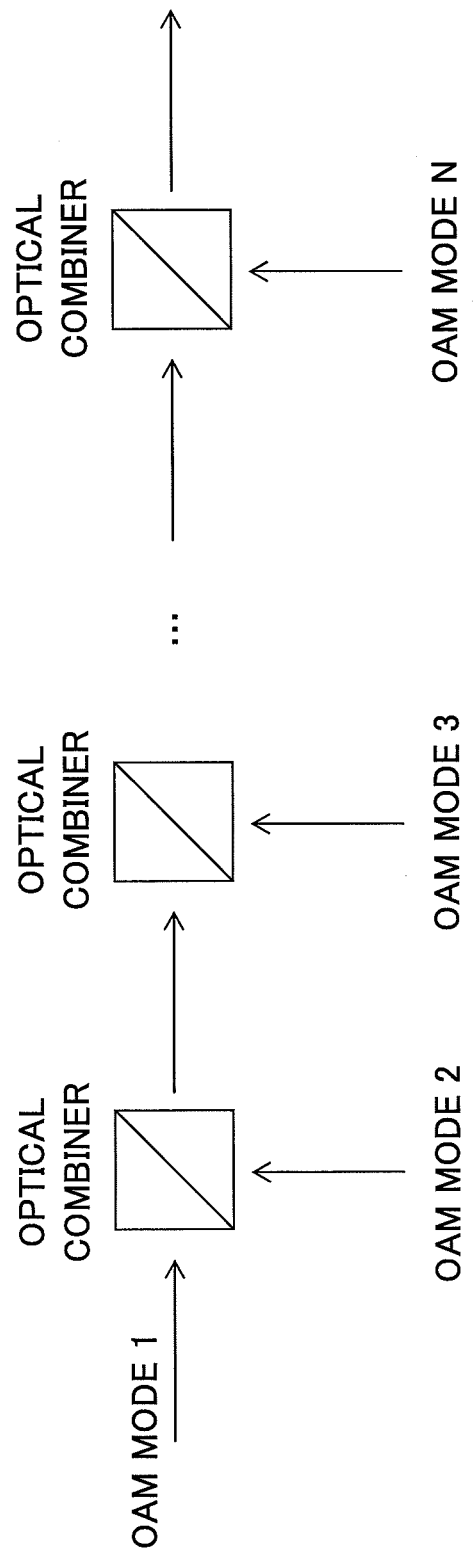
FIG. 3 illustrates a configuration of optical communication in which OAM signals are superposed with respect to a single optical axis by using optical combiners.
Figure 4:
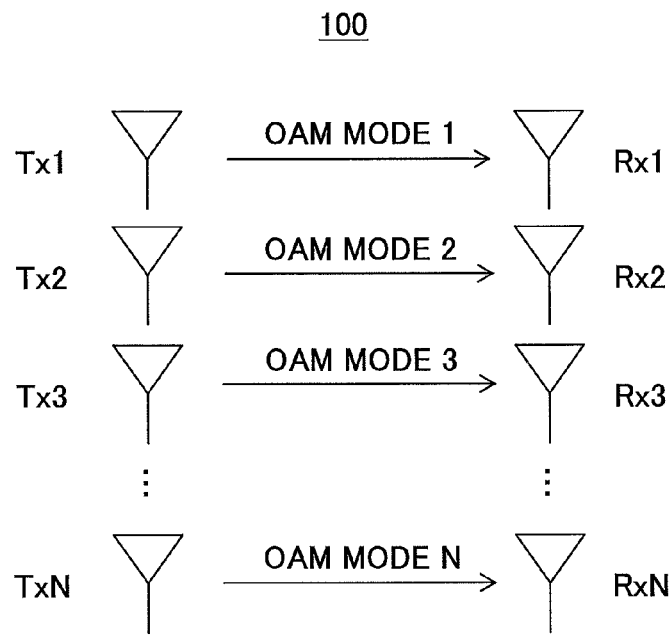
FIG. 4 illustrates an arrangement of transmitting antennas and receiving antennas included in an antenna apparatus according to an embodiment.
Figure 5:
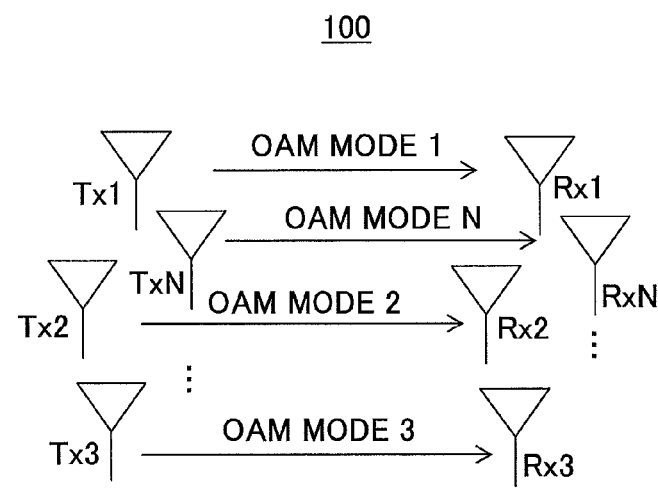
FIG. 5 illustrates an arrangement of the transmitting antennas and the receiving antennas included in the antenna apparatus according to the embodiment.

FIGS. 4 and 5 illustrate an arrangement of transmitting antennas and receiving antennas included in an antenna apparatus 100 according to the present embodiment.

The antenna apparatus 100 includes transmitting antennas Tx1, Tx2, Tx3, . . . TxN and receiving antennas Rx1, Rx2, Rx3, . . . RxN. Herein, N represents an integer number greater than or equal to two. In the embodiment as illustrated in FIGS. 4 and 5, a case where N is greater than or equal to five will be described.

As illustrated in FIG. 4, the transmitting antennas Tx1, Tx2, Tx3, . . . TxN and the receiving antennas Rx1, Rx2, Rx3, . . . RxN may be arranged in a linear fashion, respectively. The transmitting antennas Tx1, Tx2, Tx3, . . . TxN and the receiving antennas Rx1, Rx2, Rx3, . . . RxN are arranged in a manner that optical axes of the transmitting antennas Tx1, Tx2, Tx3, . . . TxN and optical axes of the receiving antennas Rx1, Rx2, Rx3, . . . RxN correspond to each other, respectively.

The transmitting antennas Tx1, Tx2, Tx3, . . . TxN communicate with the receiving antennas Rx1, Rx2, Rx3, . . . RxN, respectively. Accordingly, the transmitting antenna Tx1 communicates with the receiving antenna Rx1. Similarly, the transmitting antenna Tx2 communicates with the receiving antenna Rx2. The transmitting antenna Tx3 communicates with the receiving antenna Rx3. Moreover, the transmitting antenna TxN communicates with the receiving antenna RxN.

As a result, it is possible to perform communications in N channels between the transmitting antennas Tx1, Tx2, Tx3, . . . TxN and the receiving antennas Rx1, Rx2, Rx3, . . . RxN.

In the antenna apparatus 100 according to the present embodiment, each of the transmitting antennas Tx1, Tx2, Tx3, . . . TxN performs mode conversion in which RF signal without OAM mode is converted into an RF signal having orbital angular momentum (OAM) of designated mode and transmits the RF signal having OAM of the designated mode. Each of the receiving antennas Rx1, Rx2, Rx3, . . . RxN performs reverse conversion in which the RF signal having OAM of the designated mode is reversely converted into the RF signal without OAM mode.

The RF signal having OAM propagates in a spiral manner along an optical axis of the transmitting antenna Tx while shifting a phase of the RF signal having OAM. The optical axis extends in a propagation direction of the RF signal having OAM. Accordingly, the RF signal having OAM has a spiral shaped wavefront (a helicoid wavefront) having a central axis corresponding to the optical axis.

Herein, mode 1 (1=±1, ±2, . . . ) of the RF signal having OAM indicates that a phase delay of 2lπ is included in a physical one cycle (360 degrees). Mode 1 indicates that a phase delay of 2π is included in the physical one cycle (360 degrees).

Accordingly, the RF signal having OAM of mode 1 (1=1) has a wavefront of which the phase shifts 2π while the RF signal having OAM of mode 1 (1=1) propagates in a spiral manner in the physical one cycle (360 degrees). The RF signal having OAM of mode 2 (1=2) has a wavefront of which the phase shifts 4π (2π×2) while the RF signal having OAM of mode 2 (1=2) propagates in a spiral manner in the physical one cycle (360 degrees). Accordingly, the RF signal having OAM of mode 1 has a wavefront of which the phase shifts 2lπ while the RF signal having OAM of mode 1 propagates in a spiral manner in the physical one cycle (360 degrees).

Herein, a value 1 of mode 1 takes a positive value when the RF signal having OAM of mode 1 propagates along the optical axis in a spiral manner of the counterclockwise direction, and takes a negative value when the RF signal having OAM of mode 1 propagates along the optical axis in a spiral manner of the clockwise direction.

Since the antenna apparatus 100 uses the RF signal having OAM, it is necessary to arrange the receiving antennas Rx1~RxN in positions where the receiving antennas Rx1~RxN can receive the RF signals having OAM from the transmitting antennas Tx1~TxN, respectively.

The RF signal having OAM propagates in a spiral manner along the optical axis which extends along the propagation direction while shifting the phase. Accordingly, the RF signal having OAM propagates in a spiral manner along the optical axis. The phase of the RF signal having OAM is determined by an azimuthal angle of the spiral shaped wavefront.

Accordingly, in order to receive the whole cycles of the RF signals having OAM in N channels, it is necessary to bring the optical axes of the receiving antennas Rx1~Rx in line with the optical axes of the transmitting antennas Tx1~TxN, respectively.

The transmitting antennas Tx1~TxN that transmit the RF signals having OAM and the receiving antennas Rx1~RxN that receive the RF signals having OAM have designated configurations that can realize the mode conversion and the reverse conversion, respectively.

However, details of the configurations of the transmitting antennas Tx1~TxN and the receiving antennas Rx1~RxN will be described later. In FIGS. 4 and 5, positional relationships between the transmitting antennas Tx1~TxN and the receiving antennas Rx1~RxN will be described.

Thus, the transmitting antennas Tx1, Tx2, Tx3, . . . TxN and the receiving antennas Rx1, Rx2, Rx3, . . . RxN may be arranged in a linear fashion as long as the optical axes of the transmitting antennas Tx1, Tx2, Tx3, . . . TxN and the optical axes of the receiving antennas Rx1, Rx2, Rx3, . . . RxN correspond to each other, respectively, as illustrated in FIG. 4.

Otherwise, the transmitting antennas Tx1, Tx2, Tx3, . . . TxN and the receiving antennas Rx1, Rx2, Rx3, . . . RxN may be arranged in a random fashion as long as the optical axes of the transmitting antennas Tx1, Tx2, Tx3, . . . TxN and the optical axes of the receiving antennas Rx1, Rx2, Rx3, . . . RxN correspond to each other, respectively, as illustrated in FIG. 5.

In FIGS. 4 and 5, the transmitting antenna Tx1 and the receiving antenna Rx1 perform communication which uses the RF signal having OAM of mode 1, and the transmitting antenna Tx2 and the receiving antenna Rx2 perform communication which uses the RF signal having OAM of mode 2.

In FIGS. 4 and 5, the transmitting antenna Tx3 and the receiving antenna Rx3 perform communication which uses the RF signal having OAM of mode 3, and the transmitting antenna TxN and the receiving antenna RxN perform communication which uses the RF signal having OAM of mode N.

However, an assignment of mode 1 as illustrated in FIGS. 4 and 5 is illustrative only. Each pair of the transmitting antennas Tx1~TxN and the receiving antennas Rx1~RxN communicates with each other by using the RF signal having OAM of the same mode. Each pair of the transmitting antennas Tx1~TxN and the receiving antennas Rx1~RxN is not able to communicate with each other by using the RF signals having OAM of different modes.

Accordingly, all of the pairs of the transmitting antennas Tx1~TxN and the receiving antennas Rx1~RxN may communicate by using the RF signals having OAM of the same mode.

Next, a single mode and a multiple mode will be described with reference to FIGS. 6 and 7.

Figure 6:
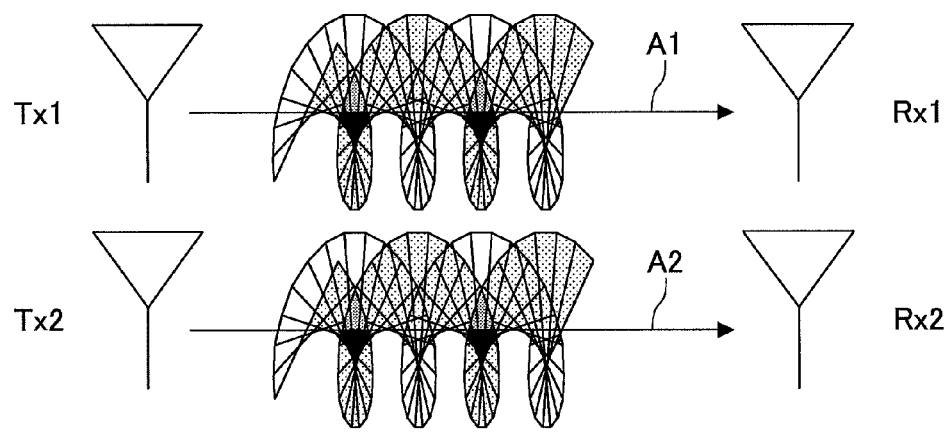
FIG. 6 is a diagram illustrating wavefronts of RF signals having OAM according to the single mode.

FIG. 6 is a diagram illustrating wavefronts of RF signals having OAM according to the single mode. FIG. 7 is a diagram illustrating wavefronts of RF signals having OAM according to the multiple mode. In FIGS. 6 and 7, the transmitting antennas Tx1 and Tx2 and the receiving antennas Rx1 and Rx2 perform communications in two channels.

In the single mode, the RF signals having OAM used in plural of channels have the same (single) mode 1. In the multiple mode, the RF signals having OAM used in plural of channels have plural modes, i.e. more than two modes. Since the communications in two channels are illustrated in FIGS. 6 and 7, the RF signals having OAM of the same mode 1 are illustrated in FIG. 6.

The RF signals having OAM of the same mode 1, as illustrated in FIG. 6, propagate along optical axes A1 and A2 in a spiral manner, respectively.

Figure 7:
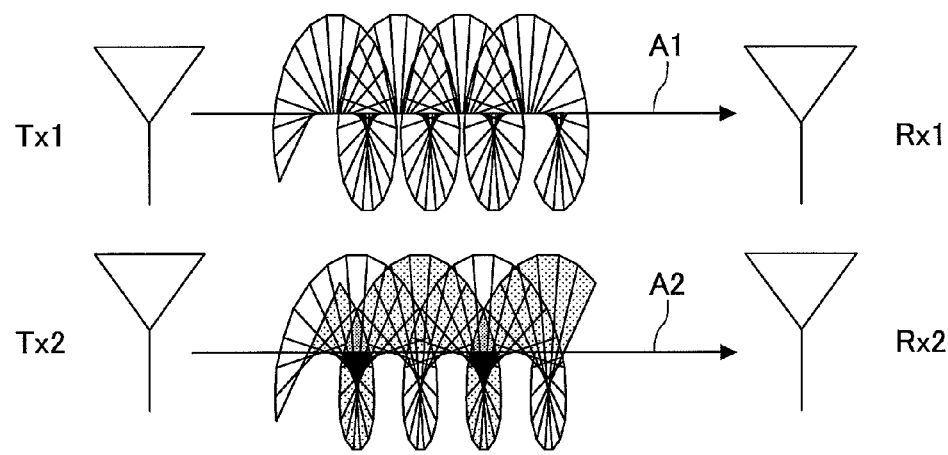
FIG. 7 is a diagram illustrating wavefronts of RF signals having OAM according to the multiple mode.

In FIG. 7, the RF signals having OAM of two different modes are illustrated. The RF signals having OAM of the different modes, as illustrated in FIG. 7, propagate along optical axes A1 and A2 in a spiral manner, respectively.

In FIGS. 6 and 7, the wavefronts of the RF signals having OAM are illustrated schematically.

Next, low interference of the two channels that are realized by the two neighboring receiving antennas will be described with reference to FIG. 8. Herein, receiving antennas Rx1 and Rx2 are used as an example of the two neighboring receiving antennas.

Figure 8:
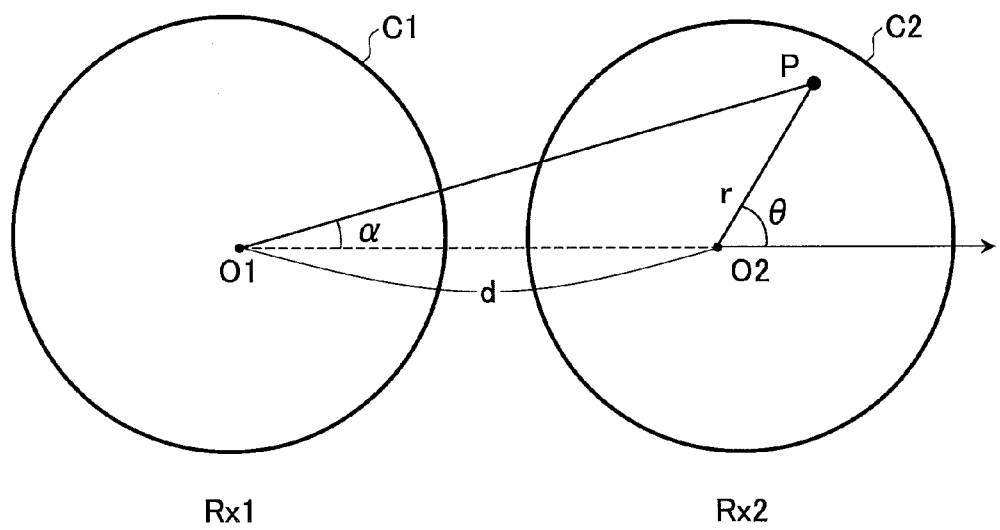
FIG. 8 is a diagram illustrating positional relationship between two neighboring receiving antennas included in the antenna apparatus of the present embodiment in plan view.

FIG. 8 is a diagram illustrating positional relationship between the two neighboring receiving antennas included in the antenna apparatus 100 of the present embodiment in plan view.

In FIG. 8, center points O1 and O2 and outlines C1 and C2 of the receiving antennas Rx1 and Rx2 as viewed from the propagating direction of RF signals having OAM are illustrated. In reality, the receiving antennas Rx1 and Rx2 are arranged adjacently to each other as illustrated in FIG. 7 and perform communications in the single mode or the multiple mode in the two channel.

The outlines C1 and C2 of the receiving antennas Rx1 and Rx2 are shaped in circles that have the center points O1 and O2 and radii R, respectively. Distance between the center points O1 and O2 is d. Since the receiving antennas Rx1 and Rx2 are separated from each other, the distance d is greater than 2R, i.e., 2R<=d.

The optical axes of the receiving antennas Rx1 and Rx2 pass through the center points O1 and O2 and extend in the directions vertical to the circles represented by the outlines C1 and C2, respectively.

The transmitting antennas Tx1 and Tx2 corresponding to the receiving antennas Rx1 and Rx2 are arranged on the opposite side to the receiving antennas Rx1 and Rx2, as illustrated in FIG. 7, and have the same configurations as those of the receiving antennas Rx1 and Rx2, respectively. The optical axes of the transmitting antennas Tx1 and Tx2 are identical to the optical axes of the receiving antennas Rx1 and Rx2, respectively.

Accordingly, the transmitting antenna Tx1 and the receiving antenna Rx1 have the same configurations with each other and face each other in a state where the optical axes thereof are identical to each other. Similarly, the transmitting antenna Tx2 and the receiving antenna Rx2 have the same configurations with each other and face each other in a state where the optical axes thereof are identical to each other.

Thus, distance between the center point of the transmitting antenna Tx1 and the center point of the transmitting antenna Tx2 is d.

The transmitting antenna Tx1 and the receiving antenna Rx1 use the RF signal having OAM of mode m to communicate with each other. The transmitting antenna Tx2 and the receiving antenna Rx2 use the RF signal having OAM of mode n to communicate with each other. Integer numbers m and n are arbitrary number and may be the same number or different numbers.

Herein, in order to explain the low interference between the receiving antennas Rx1 and Rx2, reception of the RF signals having OAM transmitted from the transmitting antennas Tx1 and Tx2 at a point P which is located on a surface of the receiving antenna Rx2 will be described.

A distance between the point P and the center point O2 of the receiving antenna Rx2 is r (r<R). Line segment O1O2 and line segment O2P intersect at the center point O2 at angle θ. Line segment O1P and the line segment O1O2 intersect at the center point O1 at angle α.

Since the optical axes of the receiving antennas Rx1 and Rx2 that constitute the two channels are different from each other as illustrated in FIG. 8, an electric field E at the point P transmitted from the transmitting antenna Tx1 is represented by a following formula (2).

$$E = E_0 e^{jm\alpha} \quad (2)$$

Herein, $E_0$ represents an amplitude of the electric field E.

Power Pim,n of the RF signal having OAM which is transmitted from the transmitting antenna Tx1 and is received by the receiving antenna Rx2 is represented by a following formula (3). The power Pim,n represents power of an interference which occurs at the receiving antenna Rx2 in a case where the receiving antenna Rx2 receives the RF signal having OAM from the transmitting antenna Tx1.

$$P_{m,n}^i \propto \frac{1}{Z} \left\| \int_0^R \int_{-\pi}^{\pi} E_0 e^{jm\alpha} e^{-jn\theta} d\theta r \, dr \right\|^2 \quad (3)$$

Herein, Z represents an impedance of the RF signal having OAM in a free space.

The angle α which is made by the intersection of the line segment O1P and the line segment O1O2 is represented by a following formula (4).

$$\alpha = \tan^{-1}\left(\frac{r\sin\theta}{d + r\cos\theta}\right) \quad (4)$$

Similar to the formula (3), power Psn of the RF signal having OAM which is transmitted from the transmitting antenna Tx2 and is received by the receiving antenna Rx2 is represented by a following formula (5).

$$P_n^s \propto \frac{1}{Z} \left\| \int_0^R \int_{-\pi}^{\pi} E_0 e^{jn\theta} e^{-jn\theta} d\theta r\, dr \right\|^2 = \frac{E_0^2}{Z} \pi^2 R^4 \quad (5)$$

Accordingly, it is possible to derive a following formula (6) by calculating a ratio of the power Pim,n to the power Psn based on formulae (3) and (5).

$$P_{m,n}^i / P_n^s = \frac{1}{\pi^2 R^4} \left\| \int_0^R \int_{-\pi}^{\pi} e^{jm\alpha} e^{-jn\theta} d\theta r\, dr \right\|^2 \quad (6)$$

An integral term I|r included in the formula (6) is represented by a following formula (7).

$$I|_r = \int_{-\pi}^{\pi} e^{jm\alpha} e^{-jn\theta} d\theta \quad (7)$$

Herein, a calculation result of the formula (7) becomes zero if m and n satisfy the condition given by (8).

If $m>0\ n>0$, $m$ is even number and $n>=m/2+1$

If $m<0\ n<0$, $-m$ is even number and $-n>=-m/2+1$ $\quad (8)$

Therefore, a calculation result of the formula (6) becomes zero. Accordingly, the ratio of the power Pim,n to the power Psn becomes zero, and thereby the interference from Tx1-Rx1 to Tx2-Rx2 is suppressed. Meanwhile, the interference from Tx2-Rx2 to Tx1-Rx1 also needs suppressing. Then, m and n should satisfy the condition given by (9).

If $m>0\ n>0$, $n$ is even number and $m>=n/2+1$

If $m<0\ n<0$, $-n$ is even number and $-m>=-n/2+1$ $\quad (9)$

Herein, if m and n satisfy both (8) and (9), the two channels are orthogonal.

Since the OAM mode represents the spiral wavefront rotates 1 periods in one cycle, in which 1 is an integer, when (8) and (9) are both satisfied, the spiral wavefronts of the two transmitting antennas rotate in the same direction, and the spiral wavefront of each transmitting antenna rotate less than twice as fast as the other antenna, and the spiral wavefront of each transmitting antenna rotates 1 periods in one cycle, in which 1 is even number.

In fact, as in FIGS. 4 and 5, in an N-channel system, the best condition is that any two channels are orthogonal. it means that the spiral wavefronts of all the transmitting antennas rotate in the same direction, and the spiral wavefront of each transmitting antenna rotate less than twice as fast as the other antenna, and the spiral wavefront of each transmitting antenna rotates 1 periods in one cycle, in which 1 is even number. {2}, {-2}, {4, 6}, {-4, -6} are some examples of such orthogonal channel groups.

For {2}, 2 is first even number, and 2 is obviously less than double of 2. {2} means OAM mode 2 is applied in all the N channels.

For {4, 6}, 4 and 6 are both even number, and 6 is less than double of 4. {4, 6} means OAM mode 4 is applied in all the N channels, or OAM mode 6 is applied in all the N channels, or OAM mode 4 is applied in some channels and OAM mode 6 is applied in other channels.

For {-2} and {-4, -6}, the system setup is similar and the only difference is the rotation direction.

Besides orthogonal channels, channels with low interference can also be used. For two channels (mode m and mode n), the condition of low interference is given by (10).

If $m>0\ n>0$, $m>=n/2$, and $n>=m/2$

If $m<0\ n<0$, $-m>=-n/2$, and $-n>=m/2$ $\quad (10)$

It means that the spiral wavefronts of the two transmitting antennas rotate in the same direction, and the spiral wavefront of each transmitting antenna rotate no more than twice as fast as the other antenna. It is clear that orthogonal channels satisfied this condition.

Therefore, as in FIGS. 4 and 5, in an N-channel system it is expected that any two channels are of low interference. It means that the spiral wavefronts of all the transmitting antennas rotate in the same direction, and the spiral wavefront of each transmitting antenna rotate no more than twice as fast as the other antenna. {1, 2}, {-1, -2}, {2, 3, 4}, {-2, -3, -4} are some examples of such channel groups with low interference.

For {1, 2}, 2 is no more than double of 1. {1, 2} means OAM mode 1 is applied in all the N channels, or OAM mode 2 is applied in all the N channels, or OAM mode 1 is applied in some channels and OAM mode 2 is applied in other channels For {2, 3, 4}, 4 is no more than double of 2. {2, 3, 4} means OAM mode 2 is applied in all the N channels, or OAM mode 3 is applied in all the N channels, or OAM mode 4 is applied in all the N channels, or OAM mode 2 is applied in some channels and OAM mode 3 is applied in other channels, or OAM mode 2 is applied in some channels and OAM mode 4 is applied in other channels, or OAM mode 3 is applied in some channels and OAM mode 4 is applied in other channels, or OAM mode 2 is applied in some channels and OAM mode 3 is applied in some channels and OAM mode 4 is applied in other channels.

For {-1, -2} and {-2, -3, -4}, the system setup is similar and the only difference is the rotation direction.

In terms of formula (6), if m>0 and n<0 or m<0 and n>0, the interference is relatively larger. Therefore, as in FIGS. 4 and 5, in an N-channel system, at least, the spiral wavefronts of all the transmitting antennas should rotate in the same direction.

Next, a channel capacity of the antenna apparatus 100 according to the present embodiment will be described with reference to FIG. 9.

Figure 9:
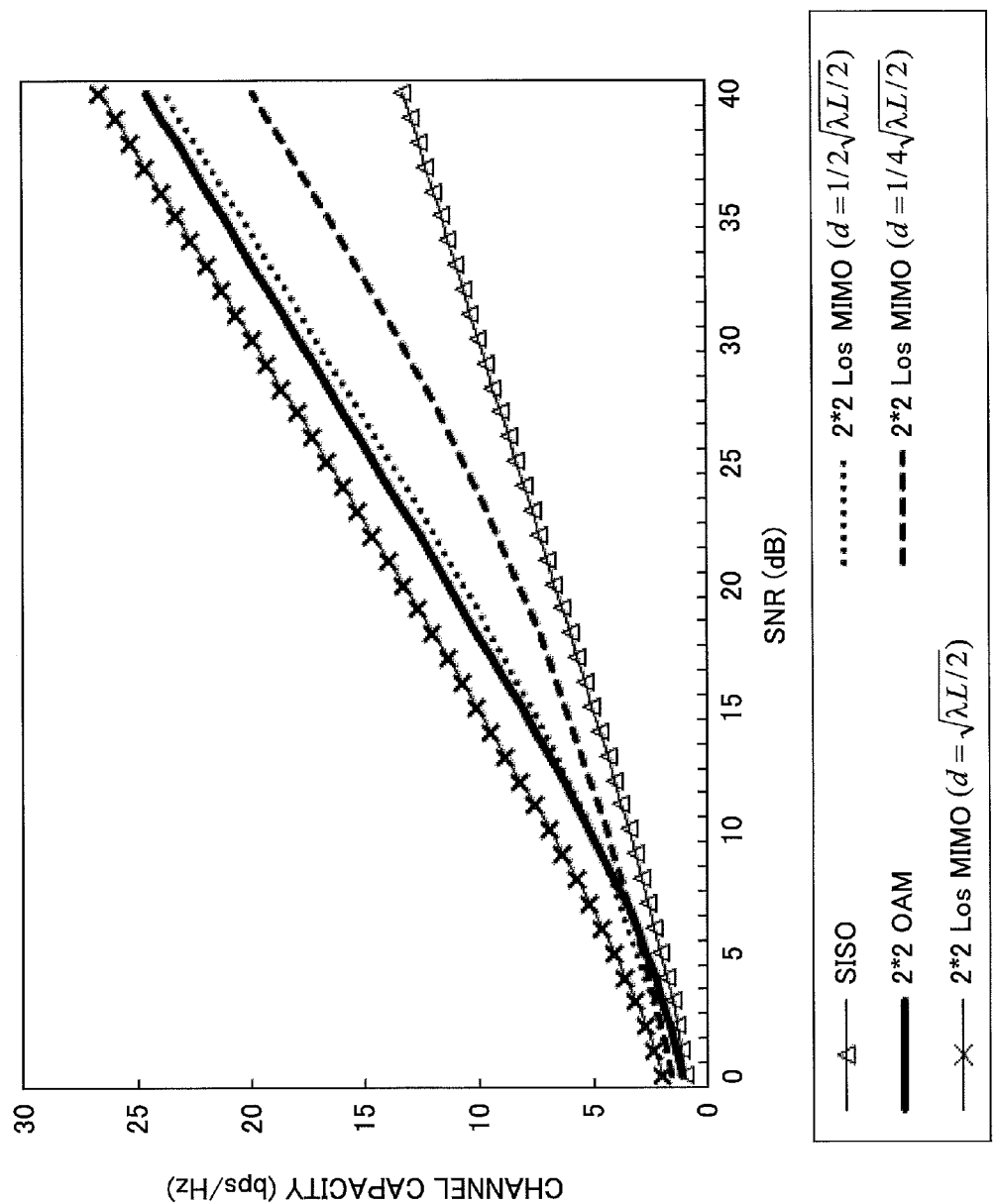
FIG. 9 is a diagram illustrating a simulation result of channel capacity of the antenna apparatus according to the present embodiment.

FIG. 9 is a diagram illustrating a simulation result of the channel capacity of the antenna apparatus 100 according to the present embodiment.

In FIG. 9, in addition to a channel capacity (2*2OAM) of the transmitting antennas Tx1 and Tx2 and the receiving antennas Rx1 and Rx2 of the antenna apparatus 100 according to the present embodiment, a channel capacity (SISO) of a transmitting antenna and a receiving antenna that constitute a SISO (Single Input Single Output) is illustrated. Further, for a comparison purpose, three channel capacities (2*2LosMIMO(d=(λL/2)$^{1/2}$), 2*2LosMIMO(d=(½*(λL/2)$^{1/2}$) and 2*2LosMIMO(d=(¼*(λL/2)$^{1/2}$)) are illustrated in FIG. 9. The three channel capacities (2*2LosMIMO(d=(λL/2)$^{1/2}$), 2*2LosMIMO(d=(½*(λL/2)$^{1/2}$) and 2*2LosMIMO(d=(¼*(λL/2)$^{1/2}$)) are obtained by three LosMIMOs including two transmitting antennas and two receiving antennas that form two channels, respectively. The three LosMIMOs have different center-to-center distances d (see FIG. 8) between the two transmitting antennas and the two receiving antennas.

The channel capacity $(2*2\text{LosMIMO}(d=(\lambda L/2)^{1/2}))$ is obtained by the LOsMIMO having the distance $d(=(*\lambda L/2)^{1/2})$. The channel capacity $(2*2\text{LosMIMO}(d=(\frac{1}{2}*(\lambda L/2)^{1/2}))$ is obtained by the LOsMIMO having the distance d $(=\frac{1}{2}*(\lambda L/2)^{1/2})$. The channel capacity $(2*2\text{LosMIMO}(d=(\frac{1}{4}*(\lambda L/2)^{1/2}))$ is obtained by the LOsMIMO having the distance d $(=\frac{1}{4}*(\lambda L/2)^{1/2})$.

Herein, L represents length between the transmitting antenna Tx1 and the receiving antenna Rx1. The length L is equal to that of transmitting antenna Tx2 and the receiving antenna Rx2.

In FIG. 9, the horizontal axis represents a Signal to Noise Ratio (SNR), and the vertical axis represents the channel capacity (bps/Hz).

As illustrated in FIG. 9, the channel capacity of the $2*2\text{LosMIMO}(d=(\lambda L/2)^{1/2}$ is slightly greater than the channel capacity (2*2OAM) obtained by the transmitting antennas Tx1 and Tx2 and the receiving antennas Rx1 and Rx2 of the antenna apparatus 100, and is the highest of all the channel capacities.

However, the channel capacity of the $2*2\text{LosMIMO}(d=(\lambda L/2)^{1/2}$ is obtained in a case where the LosMIMO has the longest distance d among three LosMIMOs.

The simulation result shows that the channel capacities of the LosMIMOs degrade with decreasing of the distance d. The shorter the distance d becomes, the lower the separation of the neighboring antennas becomes.

The channel capacity (2*2OAM) is obtained in a condition where the distance d is much shorter than the distance d $(=\frac{1}{4}*(\lambda L/2)^{1/2})$, because the distance d of the antenna apparatus 100 is close to 2R (see FIG. 8). Compared to the channel capacities of the LosMIMOs that degrade with decreasing of the center-to-center distance d, the channel capacity (2*2OAM) shows very high value in spite of the short center-to-center distance d of the antenna apparatus 100.

The SISO shows the lowest channel capacity as illustrated in FIG. 9. Although the channel capacity of the SISO increases with increasing of the SNR, the channel capacity of the SISO is lower than the channel capacity (2*2OAM) of the transmitting antennas Tx1 and Tx2 and the receiving antennas Rx1 and Rx2 of the antenna apparatus and the three channel capacities of the three LosMIMOs.

Next, with reference to FIG. 10, a relationship between value β which satisfies an equation $d=\beta(\lambda L/2)^{1/2}$ and the channel capacity will be described in a condition where the SNR is fixed to 20 dB.

Figure 10:
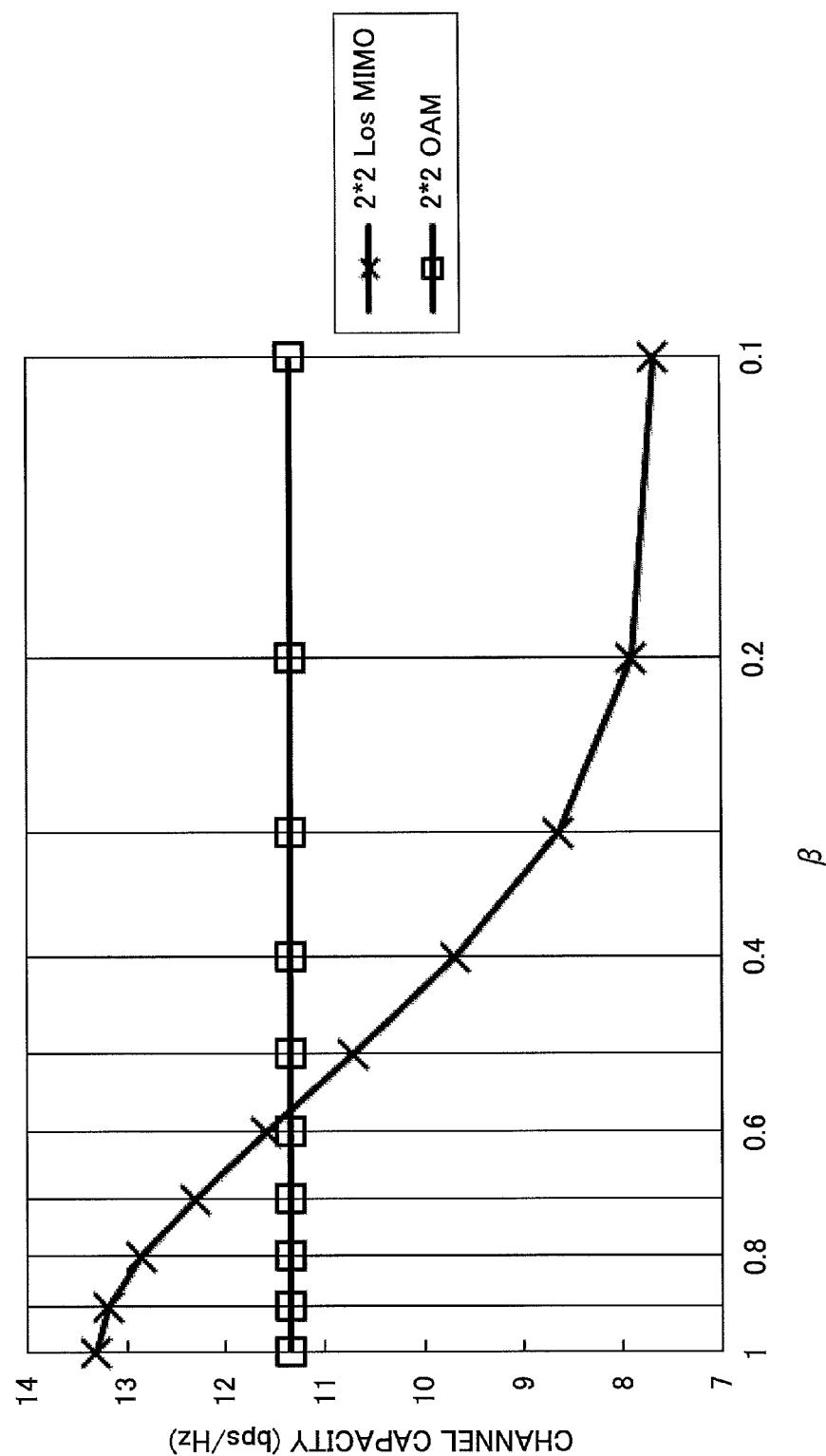
FIG. 10 is a diagram illustrating the relationship between value β which satisfies the equation $d=\beta(\lambda L/2)^{1/2}$ and the channel capacity in a condition where SNR is fixed to 20 dB.

FIG. 10 is a diagram illustrating the relationship between the value β which satisfies the equation $d=\beta(\lambda L/2)^{1/2}$ and the channel capacity in a condition where the SNR is fixed to 20 dB.

In FIG. 10, the channel capacity (2*2OAM) of the transmitting antennas Tx1 and Tx2 and the receiving antennas Rx1 and Rx2 of the antenna apparatus 100 according to the present embodiment and the channel capacity (2*2LosMIMO) of the two neighboring transmitting antennas and the two neighboring receiving antennas that form the LosMIMO are illustrated.

Since the horizontal axis of the FIG. 10 represents the value β which satisfies the equation $d=\beta(\lambda L/2)^{1/2}$, the center-to-center distance decreases with decreasing of the value β. Accordingly, the neighboring two antennas separate with increasing of the value β.

The center-to-center distance d becomes shorter with decreasing of the value β. Accordingly, the neighboring two antennas come closer with decreasing of the value β.

As illustrated in FIG. 10, the channel capacity (2*2OAM) of the transmitting antennas Tx1 and Tx2 and the receiving antennas Rx1 and Rx2 of the antenna apparatus 100 is constant regardless of the value β. This result is derived from a feature that the high channel capacity is obtained regardless of the center-to-center distance d.

The channel capacity (2*2LosMIMO) of the two neighboring transmitting antennas and the two neighboring receiving antennas that form the two channel LosMIMO decreases with decreasing of the value β.

This shows that the channel capacity degrades drastically as the center-to-center distance d becomes shorter.

According to the present embodiment, it is possible to obtain the high channel capacity (2*2OAM) regardless of the center-to-center distance d between the transmitting antennas Tx1 and Tx2 and the receiving antennas Rx1 and Rx2.

Further, the shorter the center-to-center distance d becomes, the greater the advantage of the channel capacity (2*2OAM) of the antenna apparatus 100 becomes compared to the channel capacity (2*2LosMIMO).

Thus, the antenna apparatus 100 of the present embodiment becomes more advantageous in a situation where the separation of the neighboring antennas is relatively low than in a situation where the separation of the neighboring antennas is relatively high. Accordingly, the antenna apparatus 100 of the present embodiment is suitable for downsizing.

Next, configurations of the transmitting antennas Tx1 and Tx2 and the receiving antennas Rx1 and Rx2 of the antenna apparatus 100 will be described with reference to FIGS. 11 to 14.

Hereinafter, in a case where the transmitting antennas Tx1 and Tx2 are not distinguished, the transmitting antenna of the present embodiment is referred to as a transmitting antenna Tx. Similarly, in a case where the receiving antennas Rx1 and Rx2 are not distinguished, the receiving antenna of the present embodiment is referred to as a receiving antenna Rx.

Since the transmitting antenna Tx and the receiving antenna Rx have the same configuration, the transmitting antenna Tx can be used as the receiving antenna Rx, and the receiving antenna Rx can be used as the transmitting antenna Tx.

Accordingly, in a case where the transmitting antenna Tx and the receiving antenna Rx are not distinguished, the antenna of the present embodiment is referred to as an antenna 10 or 20.

Figure 11:
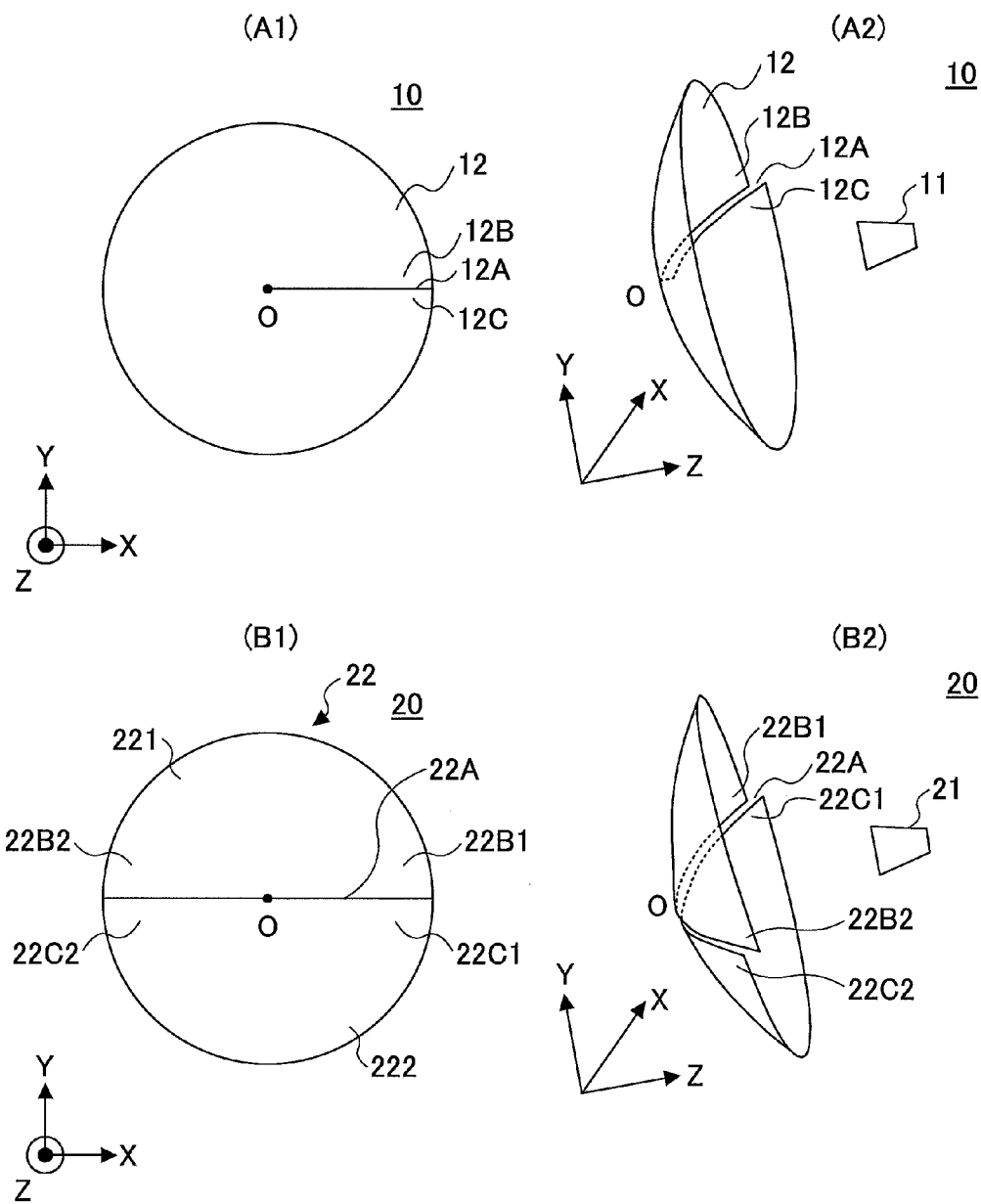
FIG. 11 is a diagram illustrating the antenna apparatus according to the present embodiment.

FIG. 11 is a diagram illustrating the antenna apparatus 100 according to the present embodiment. In FIG. 11, (A1) and (A2) illustrate the antenna 10 which transmits and receives the RF signal having OAM of mode 1, and (B1) and (B2) illustrate the antenna 20 which transmits and receives the RF signal having OAM of mode 2.

In FIG. 11, as illustrated in (A1), (A2), (B1) and (B2), XYZ coordinates system as an orthogonal coordinates is defined. The Z axis is parallel to the optical axes of the antennas 10 and 20.

As illustrated in (A1) and (A2) of FIG. 11, antenna 10 used for mode 1 includes a radiator 11 (see (A2)) and an antenna reflector 12. The antenna 10 is a type of a deformed parabola antenna. In (A1) of FIG. 11, the radiator 11 is omitted.

The radiator 11 performs transmit and receive of the RF signal. The radiator 11 is fixed to the antenna reflector 12 by stays or the like that are not illustrated. The radiator 11 transmits the RF signal to the antenna reflector 12 in the negative Z axis direction. The radiator 11 receives the RF signal which propagates in the positive Z axis direction after being reflected by the antenna reflector 12.

The antenna reflector 12 has a parabolic concaved cross section truncated by a plane including the Z axis and is shaped in a circle in plan view (see (A1) of FIG. 11). The optical axis of the antenna reflector 12 passes through the center O and extends parallel to the Z axis.

The antenna reflector 12 includes a slit 12A. The slit 12A is formed in the antenna reflector 12 so that the slit 12 extends from the center O to the periphery in the positive Z direction. A gap, with half wavelength ($\lambda/2$) of a communication frequency in the center O, is formed between one side 12B and the other side 12C of the slit 12A in the Z axis direction. The gap is used to generate one wavelength of path difference.

In the antenna reflector 12 described above, the gap is uniformly and linearly distributed from the one side 12B to the other side 12C in the counterclockwise direction around the center O in a 360 degree arc as viewed from the positive Z direction. This means that a phase of the surface of the reflector 12 progresses $\lambda/2$ ($\pi$) in a 360 degree arc from the one side 12B to the other side 12C in the counterclockwise direction around the center O as viewed from the positive Z direction.

Accordingly, if the RF signal without OAM mode is transmitted from the radiator 11 to the antenna reflector 12 in the negative Z direction, the RF signal without OAM mode radiated from the radiator 11 is mode-converted into the RF signal having OAM of mode 1 by the antenna reflector 12, and then the RF signal having OAM of mode 1 propagates in a spiral manner in the positive Z direction.

The RF signal having OAM of mode 1 which is reflected and mode-converted by the antenna reflector 12 propagates in a spiral manner around the central axis Herein, the central axis of the RF signal having OAM of mode 1 is equal to the optical axis which passes through the center O and is parallel to the Z axis. The RF signal having OAM of mode 1 which is mode-converted by the antenna reflector 12 has the same mode as the antenna 10.

On the contrary, if the RF signal having OAM mode 1 propagates in a spiral manner to the antenna reflector 12 in a state where the central axis of the RF signal having OAM mode 1 corresponds to the optical axis which passes through the center O and is parallel to the Z axis, the RF signal having OAM mode 1 is reversely converted into the planar wave by the antenna reflector 12 and the planar wave RF signal is received by the radiator 11.

The antenna 10 is a type of a parabola antenna which has a spiral reflection surface corresponding to one cycle of the spiral wavefront of the RF signal having OAM of mode 1.

As illustrated in (B1) and (B2) of FIG. 11, antenna 20 used for mode 2 includes a radiator 21 (see (B2)) and an antenna reflector 22. The antenna 20 is a type of a deformed parabola antenna. In (B1) of FIG. 11, the radiator 21 is omitted.

The radiator 21 performs transmit and receive of the RF signal. The radiator 21 is fixed to the antenna reflector 22 by stays or the like that are not illustrated. The radiator 21 transmits the RF signal to the antenna reflector 22 in the negative Z axis direction. The radiator 21 receives the RF signal which propagates in the positive Z axis direction after being reflected by the antenna reflector 22. The radiator 21 is similar to the radiator 11.

The antenna reflector 22 has a parabolic concaved cross section truncated by a plane including Z axis and is shaped in a circle in plan view (see (B1) of FIG. 11). The optical axis of the antenna reflector 22 passes through the center O and extends parallel to the Z axis.

The antenna reflector 22 includes a boundary portion 22A. The boundary portion 22A divides the antenna reflector 22 into a reflection part 221 and a reflection part 222 along the XZ plane which passes the center O. The reflection part 221 is located in the positive Y axis side, and the reflection part 222 is located in the negative Y axis side. The antenna reflector 22 is divided into the two reflection parts 221 and 222 by the boundary portion 22A.

The reflection parts 221 and 222 are obtained by dividing one parabola antenna into two parts along a line which passes through the center point of the parabola antenna.

The reflection parts 221 and 222 have a positional relation in which the reflection parts 221 and 222 are slightly rotated along the Y axis in the opposite directions with each other.

A gap, with half wavelength ($\lambda/2$) of a communication frequency in the center O is formed between one side 22B1 and the other side 22C1 of the boundary portion 22A in the Z axis direction. The gap is used to generate one wavelength of path difference.

Similarly, a gap with half wavelength ($\lambda/2$) of a communication frequency in the center O is formed between one side 22B2 and the other side 22C2 of the boundary portion 22A in the Z axis direction. The gap is used to generate one wavelength of path difference.

In the antenna reflector 22 as described above, the gap is uniformly and linearly distributed from the one side 22B1 to the one side 22B2 in the counterclockwise direction around the center O in a 180 degree radius as viewed from the positive Z direction. This means that a phase of the surface of the antenna reflector 22 progresses $\lambda/2$ ($\pi$) in a 180 degree radius from the one side 22B1 to the one side 22B2 in the counterclockwise direction around the center O as viewed from the positive Z direction.

Similarly, the gap is uniformly and linearly distributed from the other side 22C1 to the other side 22C2 in the counterclockwise direction around the center O in a 180 degree radius as viewed from the positive Z direction. This means that a phase of the surface of the antenna reflector 22 progresses $\lambda$ ($2\pi$) in a 180 degree radius from the other side 22C1 to the other side 22C2 in the counterclockwise direction around the center O as viewed from the positive Z direction.

Accordingly, if the RF signal without OAM mode is transmitted from the radiator 21 to the antenna reflector 22 in the negative Z direction, the RF signal without OAM mode radiated from the radiator 21 is mode-converted into the RF signal having OAM of mode 2 by the antenna reflector 22, and then the RF signal having OAM of mode 2 propagates in a spiral manner in the positive Z direction.

The RF signal having OAM of mode 2 which is reflected and mode-converted by the antenna reflector propagates in a spiral manner around the central axis. Herein, the central axis of the RF signal having OAM of mode 2 is equal to the optical axis which passes through the center O and is parallel to the Z axis. The RF signal having OAM of mode 2 which is mode-converted by the antenna reflector 22 has the same mode as the antenna 20.

On the contrary, if the RF signal having OAM mode 2 propagates in a spiral manner to the antenna reflector 22 in a state where the central axis of the RF signal having OAM mode 2 corresponds to the optical axis which passes through the center O and is parallel to the Z axis, the RF signal having OAM mode 2 is reversely converted into the planar wave by the antenna reflector 22 and the planar wave RF signal is received by the radiator 21.

The antenna 20 is a type of a parabola antenna which has a spiral reflection surface corresponding to one cycle of the spiral wavefront of the RF signal having OAM of mode 2.

Next, an antenna of the antenna apparatus 100 according to a variation of the present embodiment will be described with reference to FIG. 12.

Figure 12:
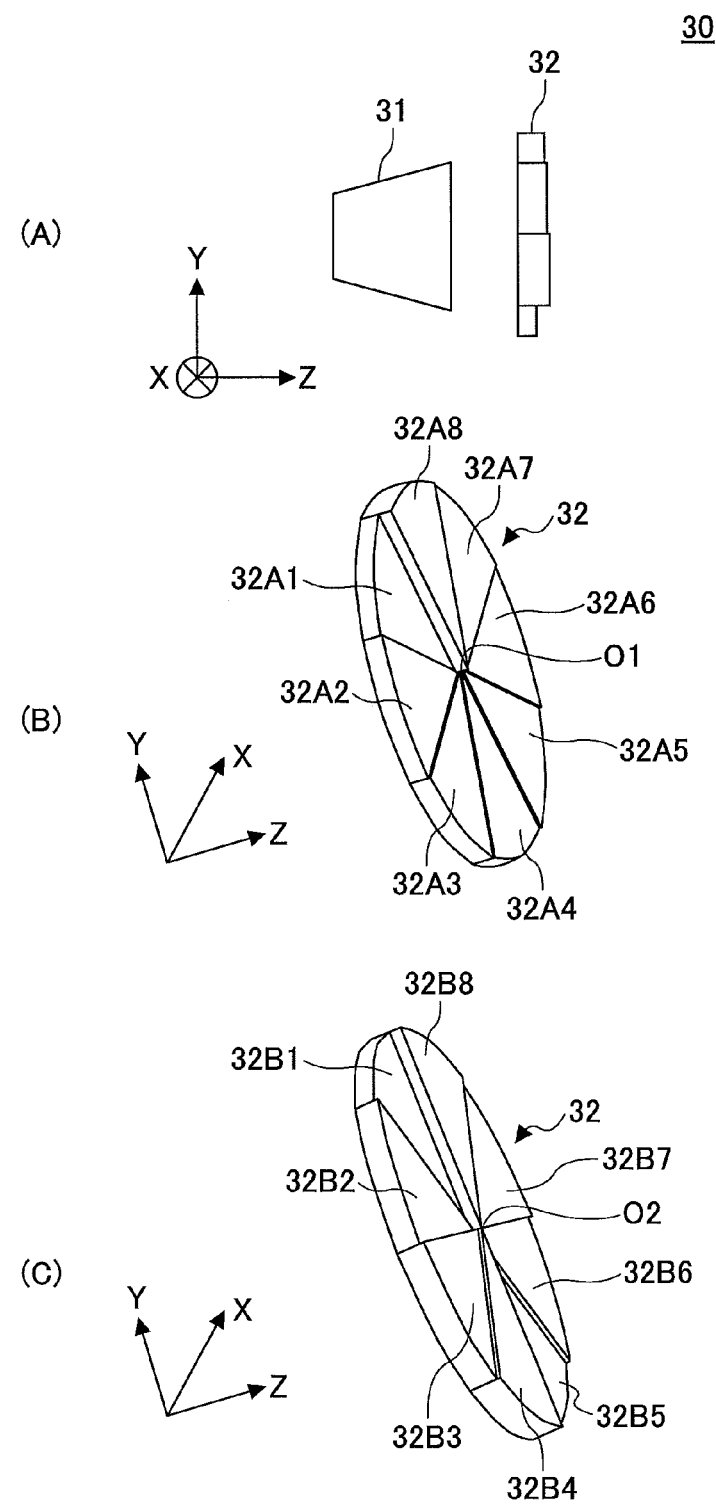
FIG. 12 is a diagram illustrating the antenna apparatus according to a variation of the present embodiment.

FIG. 12 is a diagram illustrating the antenna apparatus 100 according to the variation of the present embodiment.

In (A) of FIG. 12, an antenna 30 according to the variation of the present embodiment is illustrated. An antenna 30 includes a radiator 31 and a transmission filter 32. The transmission filter 32 of mode 1 is illustrated in (B) of FIG. 12, and the transmission filter 32 of mode 2 is illustrated in (C) of FIG. 12. In FIG. 12, the XYZ coordinates system is defined in a similar manner to that of FIG. 11.

The radiator 31 is similar to the radiators 11 and 21 as illustrated in (A2) and (B2) of FIG. 11, respectively.

The transmission filter 32 is a type of a member which has a disk shape and is made from insulating material. The transmission filter 32 can transmit the RF signal and is disposed in front of the radiator 31. The transmission filter 32 is a kind of a phase filter.

The transmission filter 32 as illustrated in (B) of FIG. 12 is divided into eight transmission portions 32A1~32A8 that are arranged in a radial fashion with respect to the center O1. The transmission portions 32A1~32A8 have fan-like shapes having 45 degree center angles, respectively, as viewed from the positive Z axis direction. The transmission portions 32A1~32A8 are arranged in the counterclockwise direction in this order as viewed from the positive Z direction. The transmission portion 32A1 and the transmission portion 32A8 are arranged next to each other.

The transmission portions 32A1~32A8 have different thicknesses. The transmission portion 32A1 is the thinnest and the transmission portion 32A8 is the thickest among the transmission portions 32A1~32A8. The transmission portions 32A1~32A8 have the different thicknesses so that the RF signal takes different periods of time when the RF signal passes through the transmission portions 32A1~32A8.

In a dielectric substance, propagation speed of the RF signal decreases compared to in the atmosphere. Accordingly, it is possible to set delay times that are given to the RF signal by the transmission portions 32A1~32A8 based on the different thicknesses of the transmission portions 32A1~32A8.

The delay time of the transmission portion 32A1 which is the thinnest is the shortest, and the delay time of the transmission portion 32A8 which is the thickest is the longest among the transmission portions 32A1~32A8. Time difference between the delay time of the transmission portion 32A1 and the delay time of the transmission portion 32A8 corresponds to period of one cycle of the RF signal radiated from the radiator 31.

Accordingly, it is possible to convert the mode of the RF signal radiated from the radiator 31 and input to the transmission filter 32 into the RF signal having OAM of mode 1 by setting differences of the thicknesses of the transmission portions 32A1~32A8 uniformly.

Herein, it is possible to reversely convert the RF signal having OAM of mode 1 to which the mode conversion is performed by the transmission filter 32 by using a transmission filter which has an inverted phase (opposite phase) with respect to the phase of the transmission filter 32.

In order to reversely convert the RF signal having OAM of mode 1 to which the mode conversion is performed by the transmission filter 32 including the transmission portions 32A1~32A8 of which the thicknesses become greater from the transmission portion 32A1 to transmission portion 32A8 in this order in the counterclockwise direction, a transmission filter including eight transmission portions having thicknesses that become greater in the clockwise direction in a manner opposite to that of transmission portions 32A1~32A8 may be used.

Accordingly, in a case where the antenna 30 including the transmission filter 32 as illustrated in (B) of FIG. 12 is used as the transmitting antenna Tx, an antenna including a transmission filter having an inverted phase with respect to the transmission filter 32 may be used as the corresponding receiving antenna Rx.

The transmission filter 32 of mode 2 is illustrated in (C) of FIG. 12. The transmission filter 32 is divided into eight transmission portions 32B1~32B8 that are arranged in a radial fashion with respect to the center O2. The transmission portions 32B1~32B8 have fan-like shapes having 45 degree center angles, respectively, as viewed from the positive Z axis direction. The transmission portions 32B1~32B8 are arranged in the counterclockwise direction in this order as viewed from the positive Z direction. The transmission portion 32B1 and the transmission portion 32B8 are arranged next to each other.

The transmission portions 32B1~32B8 have different thicknesses. The transmission portions 32B1 and 32B5 are the thinnest and the transmission portions 32B4 and 32B8 are the thickest among the transmission portions 32B1~32B8. The transmission portions 32B1~32B8 have the different thicknesses so that the RF signal takes different periods of time when the RF signal passes through the transmission portions 32B1~32B4 and 32B5~32B8.

In a dielectric substance, propagation speed of the RF signal decreases compared to in the atmosphere. Accordingly, it is possible to set delay times that are given to the RF signal by the transmission portions 32B1~32B8 based on the different thicknesses of the transmission portions 32B1~32B4 and 32B5~32B8.

The delay times of the transmission portions 32B1 and 32B5 that are the thinnest are the shortest, and the delay times of the transmission portions 32B4 and 32A8 that are the thickest are the longest among the transmission portions 32B1~32B8.

Time difference between the delay time of the transmission portion 32B1 and the delay time of the transmission portion 32B4 corresponds to a period of one cycle of the RF signal radiated from the radiator 31. Similarly, time difference between the delay time of the transmission portion 32B5 and the delay time of the transmission portion 32B8 corresponds to a period of one cycle of the RF signal radiated from the radiator 31.

Herein, the thicknesses of the transmission portions 32B1 and 32B5 are the same, the thicknesses of the transmission portions 32B2 and 32B6 are the same, the thicknesses of the transmission portions 32B3 and 32B7 are the same, and the thicknesses of the transmission portions 32B4 and 32B8 are the same.

Accordingly, it is possible to convert the mode of the RF signal radiated from the radiator 31 and input to the transmission filter 32 into the RF signal having OAM of mode 2 by setting differences of the thicknesses of the transmission portions 32B1~32A4 and 32B5~32B8 uniformly, respectively.

Herein, it is possible to reversely convert the RF signal having OAM of mode 2 to which the mode conversion is performed by the transmission filter 32 by using a transmission filter which has an inverted phase (opposite phase) with respect to the phase of the transmission filter 32.

Although, the transmission filter 32 divided into the eight transmission portions 32A1~32A8 (see (B) of FIG. 12) and the transmission filter 32 divided into the eight transmission portions 32B1~32B8 (see (C) of FIG. 12) are described, a number of division of the transmission filter 32 may be an arbitrary number. The more the divisional number of the transmission filter 32 becomes, the higher a resolution of the transmission filter 32 becomes. Accordingly, it becomes possible to obtain the RF signal having OAM from the antenna 30 that is closer to the RF signal having OAM obtained by the antennas 10 and 20 than the one obtained by the transmission filter 32 having the divisional number of eight.

Next, antenna apparatuses 100A and 100B according to variations of the present embodiment will be described with reference to FIGS. 13 and 14. The antenna apparatuses 100A and 100B have configurations in that the antennas 10 and 20 as illustrated in FIG. 11 and the antenna 30 as illustrated in FIG. 12 are combined.

Figure 13:
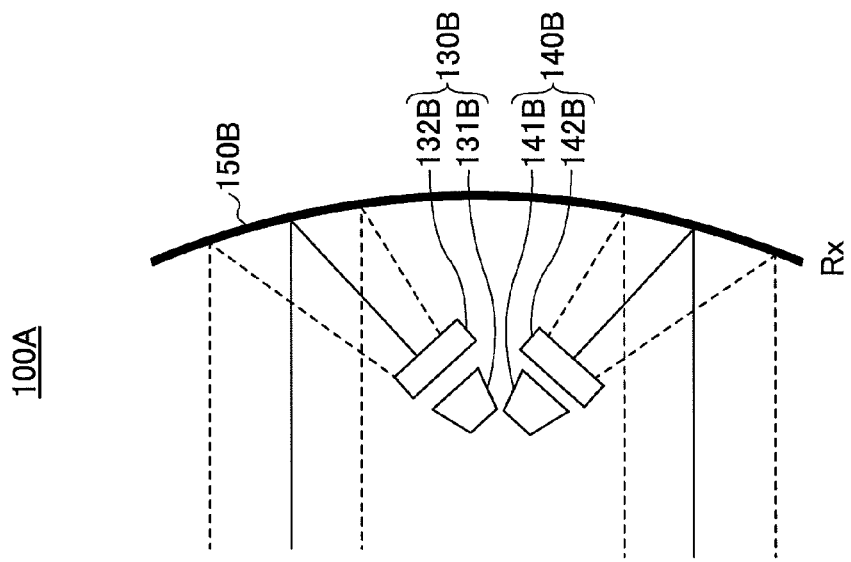
FIG. 13 is a diagram illustrating an antenna apparatus according to one variation of the present embodiment.
Figure 13:
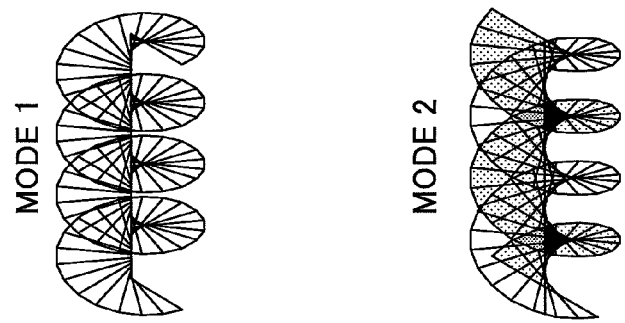
Figure 13:
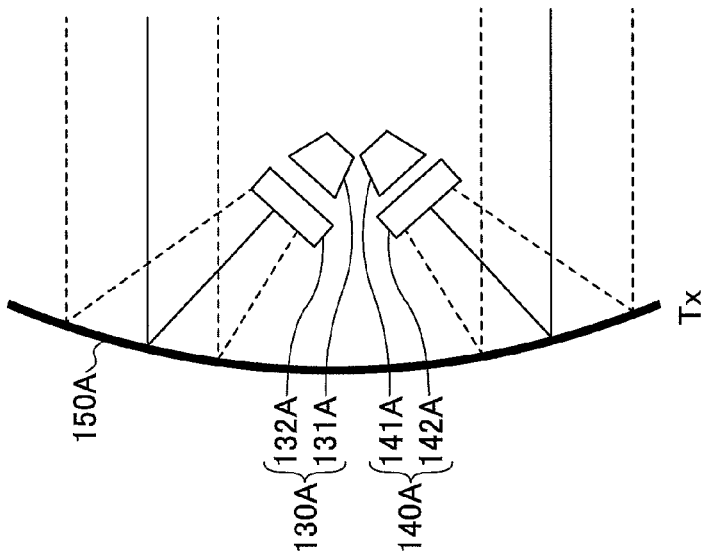

FIG. 13 is a diagram illustrating the antenna apparatus 100A according to one variation of the present embodiment. FIG. 14 is a diagram illustrating the antenna apparatus 100B according to another variation of the present embodiment.

As illustrated in FIG. 13, the antenna apparatus 100A includes antennas 130A, 130B, 140A and 140B and antenna reflectors 150A and 150B.

The antennas 130A, 130B, 140A and 140B correspond to the antenna 30 as illustrated in FIG. 12. The antennas 130A and 130B are used as the transmitting antennas, and the antennas 140A and 140B are used as the receiving antennas.

The antenna 130A includes a radiator 131A and a transmission filter 132A. The antenna 130B includes a radiator 131B and a transmission filter 132B. The antenna 140A includes a radiator 141A and a transmission filter 142A. The antenna 140B includes a radiator 141B and a transmission filter 142B.

The antenna reflector 150A has a parabolic concaved cross section truncated by a plane including the Z axis and is shaped in a circle in plan view in a similar manner to the antenna reflector 12. The antenna reflector 150B has a parabolic concaved cross section truncated by a plane including the Z axis and is shaped in a circle in plan view in a similar manner to the antenna reflector 12. The reflector 150A has two optical axes as illustrated by solid lines. The two optical axes correspond to optical axes of the transmission filters 132A and 142A, respectively. Similarly, the reflector 150B has two optical axes as illustrated by solid lines. The two optical axes correspond to optical axes of the transmission filters 132B and 142B, respectively.

The antennas 130A and 130B make a pair through the antenna reflectors 150A and 150B. The optical axes of the antennas 130A and 130B correspond to each other via the antenna reflectors 150A and 150B as illustrated by the solid line in FIG. 13.

A total phase of a delay time (phase) which is given to the RF signal by the transmission filter 132A of the antenna 130A and a delay time (phase) which is given to the RF signal by the reflector 150A corresponds to a delay time which is used for converting the planar wave RF signal radiated from the radiator 131A into the RF signal having OAM of mode 1 on the optical axis between the antennas 130A and 130B. Accordingly, the total phase corresponds to $\lambda$ ($2\pi$).

A total phase of a delay time (phase) which is given to the RF signal by the transmission filter 132B of the antenna 130B and a delay time (phase) which is given to the RF signal by the reflector 150B corresponds to a delay time which is used for reversely converting the RF signal having OAM of mode 1 into the planar wave RF signal which is input to the radiator 131B on the optical axis between the antennas 130A and 130B. Accordingly, the total phase corresponds to $\lambda$ ($2\pi$).

Similarly, the antennas 140A and 140B make a pair through the antenna reflectors 150A and 150B. The optical axes of the antennas 140A and 140B correspond to each other via the antenna reflectors 150A and 150B as illustrated by the solid line in FIG. 13.

A total phase of a delay time (phase) which is given to the RF signal by the transmission filter 142A of the antenna 140A and a delay time (phase) which is given to the RF signal by the reflector 150A corresponds to a delay time which is used for converting the planar wave RF signal radiated from the radiator 141A into the RF signal having OAM of mode 2 on the optical axis between the antennas 140A and 140B. Accordingly, the total phase corresponds to $\lambda$ ($2\pi$).

A total phase of a delay time (phase) which is given to the RF signal by the transmission filter 142B of the antenna 140B and a delay time (phase) which is given to the RF signal by the reflector 150B corresponds to a delay time which is used for reversely converting the RF signal having OAM of mode into the planar wave RF signal which is input to the radiator 141B on the optical axis between the antennas 140A and 140B. Accordingly, the total phase corresponds to $\lambda$ ($2\pi$).

The antenna apparatus 100A as described above can communicate between the antennas 130A and 130B by using the RF signal having OAM of mode 1, and can communicate between the antennas 140A and 140B by using the RF signal having OAM of mode 2.

Accordingly, it is possible to provide the antenna apparatus 100A which can perform communications in the two channels. In the antenna apparatus 100A, the communications in the two channels can be performed in the same mode 1. The antenna apparatus 100A may have a configuration in which the communications are performed in more than two channels.

The reflectors 150A and 150B may be divided into reflectors 151A and 151B and reflectors 152A and 152B included in the antenna apparatus 100B, respectively, as illustrated in FIG. 14. In this case, as illustrated in FIG. 14, the antenna apparatus 100B may not include the transmission filters 132A, 132B, 142A and 142 that are illustrated in FIG. 13.

In this case, the radiator 131A and the reflector 152A may constitute an antenna used for mode 1 such as the antenna 10 as illustrated in FIG. 11. Similarly, the radiator 131B and the reflector 152B may constitute an antenna used for mode 1 such as the antenna 10 as illustrated in FIG. 11.

Moreover, the radiator 141A and the reflector 152A may constitute an antenna used for mode 2 such as the antenna 20 as illustrated in FIG. 11. Similarly, the radiator 141B and the reflector 152B may constitute an antenna used for mode 2 such as the antenna 20 as illustrated in FIG. 11.

Each of optical axes of the reflectors 151A, 151B, 152A and 152B is offset from the center axis of a parabolic cross section of a parabola antenna. Accordingly, reflectors of offset parabola antennas may be used as the reflectors 151A, 151B, 152A and 152B.

According to the present embodiment, it is possible to provide the antenna apparatuses 100, 100A and 100B that have high channel capacity regardless of the center-to-center distance d between the transmitting antennas Tx1 and Tx2 and the receiving antennas Rx1 and Rx2.

Thus, it is possible to provide the antenna apparatuses 100, 100A and 100B that can multiplex RF signal easily.

An antenna apparatus is provided, which is capable of multiplexing RF signals easily.

The descriptions of the antenna apparatus of exemplary embodiments have been provided heretofore. The present invention is not limited to these embodiments, but various variations and modifications may be made without departing from the scope of the present invention.

The antenna apparatus is provided, which is capable of multiplexing RF signals easily.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An antenna apparatus comprising:
   N (2=<N) transmitting antennas configured to transmit RF signals having Orbital Angular Momentum (OAM) of designated modes; and
   N receiving antennas configured to make N pairs with the N transmitting antennas, respectively, and to receive the RF signals having OAM of the designated modes transmitted from the corresponding N transmitting antennas within the N pairs,
   wherein the transmitting antennas include output parts that output the RF signals and first transmitting filters that realize spiral shapes of one cycle of the RF signals by giving delays to the RF signals output from the output parts, and
   wherein the receiving antennas include second filters that realize inverted spiral shapes of one cycle of the RF signals and receiving parts that receive the RF signals transmitted through the second filters.

2. The antenna apparatus as claimed in claim 1, wherein, the N pairs of the N transmitting antennas and the N receiving antennas include two pairs of the transmitting and the receiving antennas that have interference with each other.

3. The antenna apparatus as claimed in claim 1, wherein, the N pairs of the N transmitting antennas and the N receiving antennas include two pairs of the transmitting and the receiving antennas, one pair not having interference with the other pair, the other pair having interference with the one pair.

4. The antenna apparatus as claimed in claim 1, wherein, the N pairs of the N transmitting antennas and the N receiving antennas include two pairs of the transmitting and the receiving antennas that do not have interference with each other.

5. The antenna apparatus as claimed in claim 1, wherein the N receiving antennas have optical axes, the optical axes being matched with optical axes of the corresponding N transmitting antennas within the N pairs.

6. The antenna apparatus as claimed in claim 1, wherein the transmitting antennas and the receiving antennas are parabola antennas having spiral reflection surfaces corresponding to one cycle the RF signals having OAM of the designated modes.

7. The antenna apparatus as claimed in claim 1, wherein the designated modes are types of modes that multiply delays occurred in one cycle by I, and I is even number.

8. An antenna apparatus comprising:
   N (2=<N) transmitting antennas configured to transmit RF signals having Orbital Angular Momentum (OAM) of designated modes; and
   N receiving antennas configured to make N pairs with the N transmitting antennas, respectively, and to receive the RF signals having OAM of the designated modes transmitted from the corresponding N transmitting antennas within the N pairs,
   wherein the transmitting antennas include output parts that output the RF signals, first transmitting filters that transmit the RF signals output from the output parts, and first parabola reflectors that reflect the RF signals transmitted through the first transmitting filters, and total delays of delays given by the first transmitting filters to the RF signals and delays given by the first parabola reflectors realize mode conversion of the RF signals output from the output parts to the RF signals having OAM of the designated modes, and
   wherein the receiving antennas include second parabola reflectors that reflect the RF signals having OAM of the designated modes transmitted from the transmitting antennas, second transmitting filters that give delays to the RF signals output from the second parabola reflectors, and receiving parts that receives the RF signals transmitted through the second transmitting filters, and total delays of delays given by the second parabola reflectors to the RF signals and delays given by the second transmitting filters to the RF signals realize reverse mode conversion of the RF signals input to second parabola reflectors to planar wave RF signals.

9. The antenna apparatus as claimed in claim 8, wherein, the N pairs of the N transmitting antennas and the N receiving antennas include two pairs of the transmitting and the receiving antennas that have interference with each other.

10. The antenna apparatus as claimed in claim 8, wherein, the N pairs of the N transmitting antennas and the N receiving antennas include two pairs of the transmitting and the receiving antennas, one pair not having interference with the other pair, the other pair having interference with the one pair.

11. The antenna apparatus as claimed in claim 8, wherein, the N pairs of the N transmitting antennas and the N receiving antennas include two pairs of the transmitting and the receiving antennas that do not have interference with each other.

12. The antenna apparatus as claimed in claim 8, wherein the N receiving antennas have optical axes, the optical axes being matched with optical axes of the corresponding N transmitting antennas within the N pairs.

13. The antenna apparatus as claimed in claim 8, wherein the transmitting antennas and the receiving antennas are parabola antennas having spiral reflection surfaces corresponding to one cycle the RF signals having OAM of the designated modes.

14. The antenna apparatus as claimed in claim 8, wherein the designated modes are types of modes that multiply delays occurred in one cycle by I, and I is even number.

15. A signal transmitting system comprising:
   transmitting antennas configured to have axes as Orbital Angular Momentum (OAM) axes and to transmit signals having OAMs, respectively, the OAMs having distributions of phase delays, respectively, the distributions being obtained by multiplying an angle by proportionality factors, respectively, the proportionality factors being integer numbers, respectively, different to each other, the angle being obtained around the OAM axes; and receiving antennas configured to have axes as OAM axes and to receive the respective signals, wherein the OAM axes of the transmitting antennas and the OAM axes of the receiving antennas are in line with the same lines, respectively, wherein the transmitting antennas and the receiving antennas are arranged in pairs, respectively, the OAM axes included in the pairs are arranged on different lines, respectively, and the signals having OAM are transmitted within the same frequency band at the same time period, wherein the transmitting antennas include output parts that output the RF signals, first transmitting filters that transmit the RF signals output from the output parts, and first parabola reflectors that reflect the RF signals transmitted through the first transmitting filters, and total delays of delays given by the first transmitting filters to the RF signals and delays given by the first parabola reflectors realize mode conversion of the RF signals output from the output parts to the RF signals having OAM of the designated modes, and wherein the receiving antennas include second parabola reflectors that reflect the RF signals having OAM of the designated modes transmitted from the transmitting antennas, second transmitting filters that give delays to the RF signals output from the second parabola reflectors, and receiving parts that receives the RF signals transmitted through the second transmitting filters, and total delays of delays given by the second parabola reflectors to the RF signals and delays given by the second transmitting filters to the RF signals realize reverse mode conversion of the RF signals input to second parabola reflectors to planar wave RF signals.

16. The signal transmitting system as claimed in claim 15, wherein the transmitting antennas and the receiving antennas have combinations of the proportionality factors of the same sign, respectively, and thereby constitute OAM systems.

17. The signal transmitting system as claimed in claim 16, an absolute value of the proportionality factor of a certain pair is less than twice as that of the other pair.

18. The signal transmitting system as claimed in claim 16, the proportionality factor has an even value.

19. The signal transmitting system as claimed in claim 15, the transmitting antennas and the receiving antennas of the pairs have the same OAM, respectively.

* * * * *